United States Patent
Dholakia et al.

(10) Patent No.: US 6,901,107 B1
(45) Date of Patent: May 31, 2005

(54) SYSTEMS, METHODS, AND COMPUTER PROGRAM PRODUCTS FOR GENERATING A DIGITAL IMPAIRMENT LEARNING SIGNAL HAVING LOW ENERGY CONTENT AT DIRECT CURRENT AND NYQUIST FREQUENCIES

(75) Inventors: Ajay Dholakia, Gattikon (CH); Fredy D. Neeser, Langnau (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/430,697

(22) Filed: Oct. 29, 1999

(51) Int. Cl.[7] .............................. H04B 1/38; H04L 5/16
(52) U.S. Cl. ....................................................... 375/222
(58) Field of Search ................................ 375/222, 232, 375/358, 242; 370/292

(56) References Cited

U.S. PATENT DOCUMENTS 5,852,630 A * 12/1998 Langberg et al. ........... 375/219
6,301,296 B1 * 10/2001 Krishnan et al. ........... 375/222
6,332,009 B2 * 12/2001 Olafsson ..................... 375/357

* cited by examiner

Primary Examiner—Stephen Chin
Assistant Examiner—Curtis Odom
(74) Attorney, Agent, or Firm—Scott W. Reid; Myers, Bigel, Sibley & Sajovec, P.A.

(57) ABSTRACT

Systems, methods, and computer program products generate a DIL signal in which the length of the sign pattern used for symbols in the DIL signal is a positive integer that wholly divisible by four and is not wholly divisible by three. The sign pattern may be viewed as comprising both an even and an odd subsequence with the number of positive signs balancing the number of negative signs in each subsequence. The DIL signal may be distorted by analog impairments, such as transformers, that may introduce nulls at direct current (DC) and severe non-linear distortion below 100 Hz. Moreover, low-pass filters in the PSTN typically have a sharp roll-off at the Nyquist frequency of 4 kHz. A DIL signal that includes one or more DIL segments with each DIL segment incorporating the aforementioned sign pattern may be characterized by spectral nulls at both direct current (DC) and the Nyquist frequency, which is 4 kHz for a V.90 modem application.

24 Claims, 5 Drawing Sheets

SYSTEMS, METHODS, AND COMPUTER PROGRAM PRODUCTS FOR GENERATING A DIGITAL IMPAIRMENT LEARNING SIGNAL HAVING LOW ENERGY CONTENT AT DIRECT CURRENT AND NYQUIST FREQUENCIES

FIELD OF THE INVENTION

The present invention relates generally to the field of communication, and, more particularly, to digital impairment learning in data modems, such as PCM modems.

BACKGROUND OF THE INVENTION

The demand for remote access to information sources and data retrieval, as evidenced by the success of services such as the World Wide Web, is a driving force for high-speed network access technologies. The public switched telephone network (PSTN) offers standard voice services over a 4 kHz bandwidth. Traditional analog modem standards generally assume that both ends of a modem communication session have an analog connection to the PSTN. Because voice or modem signals are typically converted from analog to digital when transmitted towards the PSTN and then from digital to analog when received from the PSTN, data rates may be limited to 33.6 kbps as defined in the ITU-T Recommendation V.34 developed by the International Telecommunications Union (ITU).

The need for an analog modem may be eliminated, however, by using the basic rate interface (BRI) of the Integrated Services Digital Network (ISDN). A BRI offers end-to-end digital connectivity at an aggregate data rate of 160 kbps, which is comprised of two 64 kbps B channels, a 16 kbps D channel, and a separate maintenance channel. ISDN offers comfortable data rates for Internet access, telecommuting, remote education services, and some forms of video conferencing. ISDN deployment, however, has generally been very slow due to the substantial investment required of network providers for new equipment. Because ISDN is not very pervasive in the PSTN, the network providers have typically tariffed ISDN services at relatively high rates, which may be ultimately passed on to the ISDN subscribers. In addition to the high service costs, subscribers must generally purchase or lease network termination equipment to access the ISDN.

While most subscribers do not enjoy end-to-end digital connectivity through the PSTN, the PSTN is nevertheless mostly digital. Typically, the only analog portion of the PSTN is the phone line or local loop that connects a subscriber or client modem (e.g., an individual subscriber in a home, office, or hotel) to the telephone company's central office (CO). Local telephone companies have been replacing portions of their original analog networks with digital switching equipment. Nevertheless, the connection between the home and the CO has been the slowest to change to digital as discussed in the foregoing with respect to ISDN BRI service. A recent data transmission recommendation issued by the ITU, known as ITU-T V.90, takes advantage of the digital conversions that have been made in the PSTN. By viewing the PSTN as a digital network, V.90 technology can accelerate data downstream from the Internet or other information source to a subscriber's computer at data rates of up to 56 kbps, even when the subscriber is connected to the PSTN via an analog local loop.

To understand how the V.90 Recommendation achieves this higher data rate, it may be helpful to briefly review the operation of V.34 analog modems. V.34 modems are generally optimized for a configuration in which both ends of a communication session are connected to the PSTN by analog lines. Even though most of the PSTN is digital, V.34 modems treat the network as if it were entirely analog. Moreover, the V.34 Recommendation assumes that both ends of the communication session suffer impairment due to quantization noise introduced by analog-to-digital converters. That is, the analog signals transmitted from the V.34 modems are sampled at 8000 times per second by a codec upon reaching the PSTN with each sample being quantized to a discrete PCM quantization level that is represented by an eight-bit pulse code modulation (PCM) codeword. The codec uses 256, non-uniformly spaced, PCM quantization levels defined according to either the μ-law or A-law coding law (i.e., the ITU G.711 Recommendation).

Because the analog waveforms are continuous and the binary PCM codewords are discrete, the digits that are sent across the PSTN can only approximate the original analog waveform. The difference between the original analog waveform and the reconstructed quantized waveform is called quantization noise, which limits the modem data rate.

In a V.34 connection, quantization noise may limit data rates to less than 33.6 kbps. The V.90 standard relies on the lack of 8-bit analog-to-digital conversions in the downstream path, to enable downstream data transmission at up to 56 kbps.

The general environment for which the V.90 standard has been developed is depicted in FIG. 1. An Internet Service Provider (ISP) 22 is connected to a subscriber's computer 24 via a V.90 digital server modem 26, through the PSTN 28 via digital trunks (e.g., T1, E1, or ISDN Primary Rate Interface (PRI) connections), through a central office switch 32, and finally through an analog loop to the client's modem 34. The central office switch 32 is drawn outside of the PSTN 28 to better illustrate the connection of the subscriber's computer 24 and modem 34 into the PSTN 28. It should be understood that the central office 32 is, in fact, a part of the PSTN 28. The operation of a communication session between the subscriber 24 and an ISP 22 is best described with reference to the more detailed block diagram of FIG. 2.

Transmission from the server modem 26 to the client modem 34 uses pulse amplitude modulation (PAM) and will be described first. The information to be transmitted is first encoded using only the 256 PCM codewords used by the digital switching and transmission equipment in the PSTN 28. These PCM codewords are transmitted towards the PSTN 28 by the PAM transmitter 36 where they are received by a network codec. The PCM data is then transmitted through the PSTN 28 until reaching the central office 32 to which the client modem 34 is connected. The PCM data are converted to analog voltage levels by the codec expander (digital-to-analog converter) 38 according to the PCM law. These voltage levels are processed by a central office hybrid 42 where the unidirectional signal received from the codec expander 38 is transmitted towards the client modem 34 as part of a bidirectional signal. A second hybrid 44 at the subscriber's analog telephone connection converts the bidirectional signal back into a pair of unidirectional signals. Finally, the analog signal from the hybrid 44 is converted into digital PAM samples by an analog-to-digital (A/D) converter 46, which are received and decoded by the PAM receiver 48. Note that for transmission to succeed effectively at 56 kbps, there must not be any 8-bit PCM analog-to-digital conversion between the server modem 26 and the client modem 34. Recall that analog-to-digital conversions in the PSTN 28 may introduce quantization noise, which may limit the data rate as discussed hereinbefore. The A/D converter 46 at the client modem 34, however, typically has a higher resolution than the A/D converters used in the analog portion of the PSTN 28 (e.g., 16 bits versus 8 bits), which results in less quantization noise. Moreover, the PAM receiver 48 needs to be in synchronization with the 8 kHz network clock to properly decode the digital PAM samples.

Transmission from the client modem 34 to the server modem 26 uses quadrature amplitude modulation (QAM) and follows the V.34 data transmission standard. That is, the client modem 34 includes a QAM transmitter 52 and a D/A converter 54 that encode and modulate the digital data. The hybrid 44 converts the unidirectional signal from the digital-to-analog converter 54 into a bidirectional signal that is transmitted to the central office 32. Once the signal is received at the central office 32, the central office hybrid 42 converts the bidirectional signal into a unidirectional signal that is provided to the central office codec. This unidirectional, analog signal is converted into either $\mu$-law or A-law PCM codewords by the codec compressor (AID converter) 56, which are then transmitted through the PSTN 28 until reaching the server modem 26. The server modem 26 includes a conventional V.34 receiver 58 for demodulating and decoding the data sent by the QAM transmitter 52 in the client modem 34. Thus, data is transferred from the client modem 34 to the server modem 26 at data rates of up to 33.6 kbps as provided for in the V.34 standard.

As described above, the digital portion of the PSTN 28 transmits information using eight-bit PCM codewords at a frequency of 8000 Hz. Thus, it would appear that downstream transmission should take place at 64 kbps rather than 56 kbps as defined by the V.90 standard. While 64 kbps is a theoretical maximum, several factors prevent actual transmission rates from reaching this ideal rate. First, even though the problem of quantization error has been substantially reduced by using PCM encoding and PAM for transmission, additional noise in the network or at the subscriber premises, such as non-linear distortion and crosstalk, may limit the maximum data rate. Furthermore, the PCM encoding technique does not use uniformly spaced voltage levels for representing data. The PCM codewords representing very low levels of sound have PAM voltage levels spaced close together. Noisy transmission facilities may prevent these PAM voltage levels from being distinguished from one another thereby causing loss of data. Accordingly, to provide greater separation between the PAM voltages used for transmission, not all of the 256 PCM codewords are used.

It is generally known that, assuming a convolutional coding scheme, such as trellis coding, is not used, the number of symbols required to transmit a certain data rate is given by Equation 1:

$$bps = R_s \log_2 N_s \qquad \text{EQ. 1}$$

where bps is the data rate in bits per second, $R_s$, is the symbol rate, and $N_s$ is the number of symbols in the signaling alphabet or constellation. To transmit at 56 kbps using a symbol rate of 8000, Equation 1 can be rewritten to solve for the number of symbols required as set forth below in Equation 2:

$$N_S = 2^{56000/8000} = 128 \qquad \text{EQ.2}$$

Thus, the 128 most robust codewords of the 256 available PCM codewords are chosen for transmission as part of the V.90 standard.

The V.90 Recommendation, therefore, provides a framework for transmitting data at rates up to 56 kbps provided the connection is capable of supporting the PCM transmission mode. The most notable requirement is that there can be at most one digital-to-analog conversion and no 8-bit PCM analog-to-digital conversion in the downstream path in the network. Nevertheless, other digital impairments, such as robbed bit signaling (RBS), digital mapping through attenuation pads (PAD), which results in attenuated signals, and code conversion between different PCM coding laws may also inhibit transmission at V.90 rates.

The V.90 Recommendation provides for the use of a digital impairment learning (DIL) signal, which is transmitted from the server/digital modem to the client/analog modem during phase three of a multi-phase startup procedure. The client/analog modem receives and analyzes the DIL signal to determine accurate estimates of the signal levels corresponding to transmitted PCM codes as well as to identify digital impairments. Moreover, the DIL signal is a programmable signal with the signal content being specified through use of a DIL descriptor. The DIL descriptor includes several fields that comprise a compact representation of the complete DIL signal. The client/analog modem fills in these fields and transmits the DIL descriptor to the digital/server modem, where the DIL signal is generated based on the specifications contained in the DIL descriptor. The downstream communication channel from the $\mu$-law or A-law expander 38 to the A/D converter 46 in the analog/client modem 34 is typically subject to analog impairments, such as frequency-dependent attenuation, non-linear distortion, and white or colored noise sources that may further distort the D/T, signal. For example, transformers typically exist wherever a 2-wire to 4-wire or 4-wire to 2-wire transformation occurs, and they may introduce nulls at direct current (DC) and severe non-linear distortion below 100 Hz. Line cards in the central office typically include a low-pass interpolation filter, which has a sharp roll-off around 4 kHz (i.e., the Nyquist frequency for the PSTN).

Consequently, there exists a need for DIL signals having improved performance in the presence of both digital and analog impairments and systems and methods for generating same.

SUMMARY OF THE INVENTION

It is an object of the present invention to provide systems, methods, and computer program products for generating digital impairment learning (DIL) signals having improved performance in the presence of both digital and analog impairments.

It is another object of the present invention to provide systems, methods, and computer program products for generating DIL signals having reduced interference between received segments of the DIL signal.

These and other objects, advantages, and features of the present invention may be provided by systems, methods, and computer program products for generating a DIL signal in which the length of the sign pattern used for symbols in the DIL signal is a positive integer that is wholly divisible by four and is not wholly divisible by three. The sign pattern may be viewed as comprising both an even and an odd subsequence with the number of positive signs balancing the number of negative signs in each subsequence.

The DIL signal may be distorted by transformers or other analog equipment that may introduce nulls at direct current (DC) and severe non-linear distortion below 100 Hz. Moreover, low-pass filters in the PSTN typically have a sharp roll-off at the Nyquist frequency of 4 kHz. Accordingly, it may be desirable to generate a DIL signal with low energy around DC and at 4 kHz to reduce distortion that may be caused by such analog impairments. Advantageously, a DIL signal that includes one or more DIL segments with each DIL segment incorporating repetitions of the aforementioned sign pattern may be characterized by spectral nulls at both direct current (DC) and the Nyquist frequency, which is 4 kHz for a V.90 modem application.

The digital PSTN transports information using a six symbol framing structure. That is, a frame comprises six data frame intervals with each data frame interval holding a single symbol. Therefore, in accordance with an aspect of the present invention, the sign pattern length wholly divides the length of a DIL segment and the DIL segment length is wholly divisible by six so that the same number of symbols are transmitted in each data frame interval.

In accordance with another embodiment of the present invention, a plurality of symbols may be organized into symbol groups with each group being associated with a contiguous subset of the plurality of symbols. A sequence of symbols may be generated by selecting symbols from the plurality of symbols such that adjacent symbols in the sequence are associated with different symbol groups. Moreover, the symbol groups corresponding to adjacent symbols are separated by at most a maximum group spacing difference.

A DIL segment with large-magnitude training symbols may cause significant distortion in an adjacent DIL segment with small-magnitude training symbols due to residual inter-symbol interference after equalization and non-linearities in the communication channel. By ensuring that adjacent symbols in the DIL signal belong to symbol groups that are separated by a maximum group spacing difference, distortion in lower power (i.e., smaller amplitude) segments due to adjacent, higher power (i.e., larger amplitude) segments may be reduced.

In accordance with an aspect of the present invention, the symbol sequence may be generated by defining a symbol group sequence and defining a symbol offset sequence. The symbol offset sequence defining the sub-sequences within the symbol sequence corresponding to symbols belonging to each of the symbol groups.

In accordance with another aspect of the present invention, the symbol offset sequence is a pseudo-random sequence.

The systems, methods, and computer program products for generating a DIL signal may be incorporated into a V.90 client/analog modem and may use such constructs as the DIL descriptor defined by the V.90 recommendation in a preferred implementation.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF THE PREFERRED EMBODIMENTS

Figure 1:
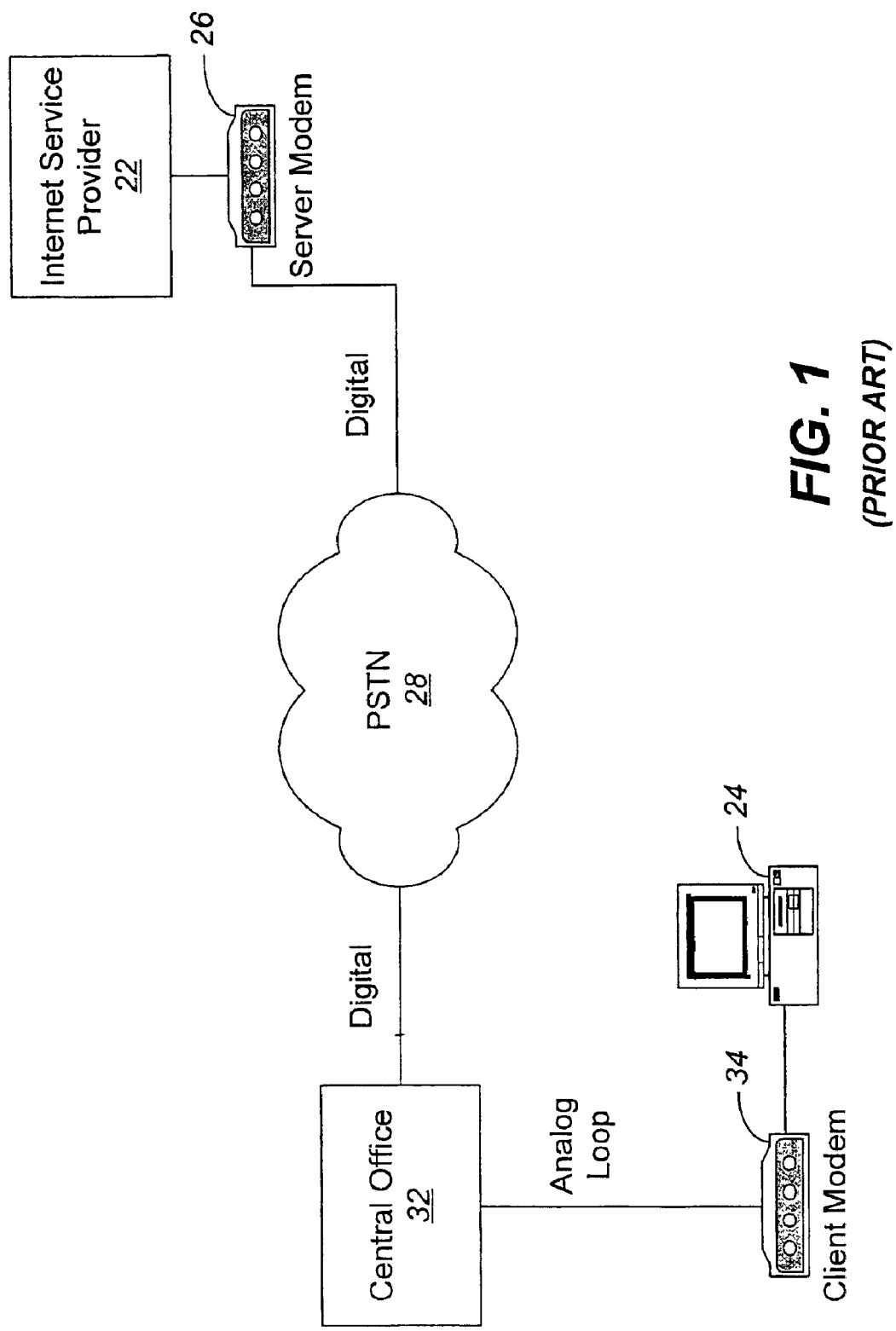
FIG. 1 is block diagram that illustrates a typical V.90 connection between a subscriber and an ISP in accordance with the prior art.
Figure 2:
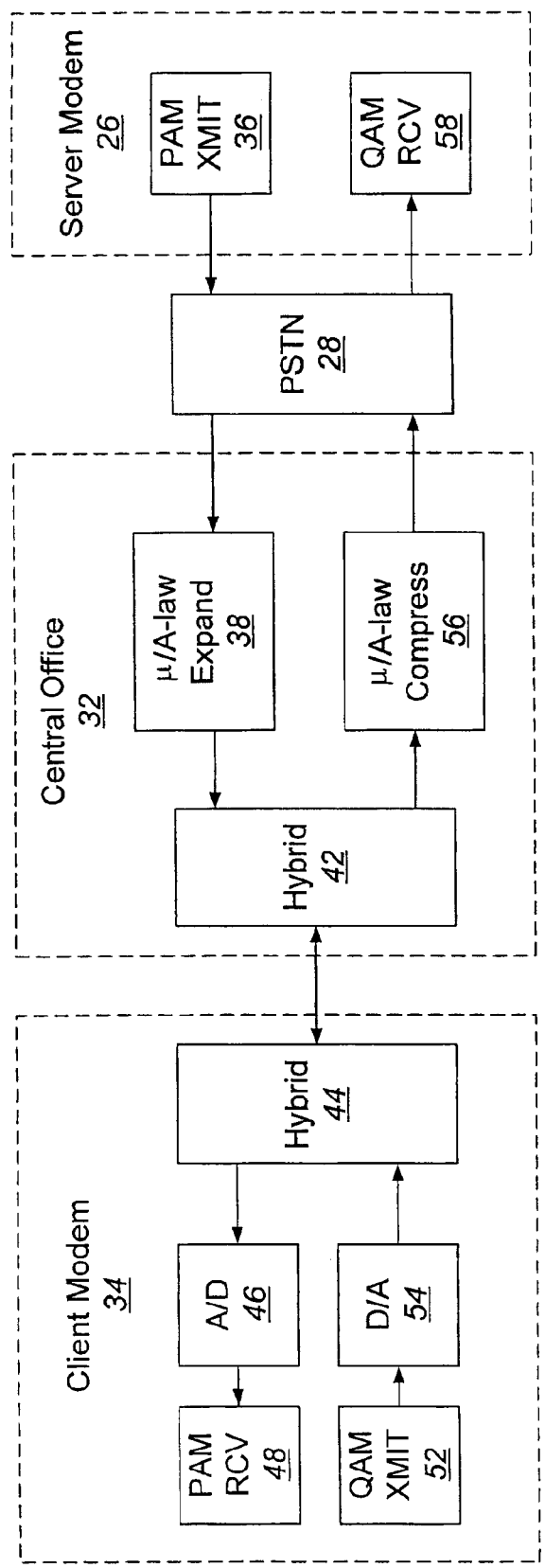
FIG. 2 is a block diagram that illustrates an internal architecture of a client modem, a central office, and a server modem shown in FIG. 1 and connections therebetween.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numbers signify like elements throughout the description of the figures.

The present invention may be embodied as a digital impairment learning (DIL) signal or as a system, a method, or a computer program product for generating a DIL signal. Accordingly, the present invention may take the form of an entirely hardware embodiment, an entirely software (including firmware, resident software, micro-code, etc.) embodiment, or an embodiment containing both software and hardware aspects. Furthermore, the present invention may take the form of a computer program product on a computer-usable or computer-readable storage medium having computer-usable program code means embodied in the medium for use by or in connection with an instruction execution system. In the context of this document, a computer-usable or computer-readable medium may be any means that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Computer program code for carrying out operations of the present invention may be written in a high level programming language such as C or C++. Some modules or routines, however, may be written in assembly language, machine language, or microcode to optimize speed, memory usage, or layout of the software or firmware in memory. In a preferred embodiment, the present invention uses microcode to implement most software programs. It should further be understood that the program code for carrying out operations of the present invention may execute entirely on a communication device, such as a V.90 client/analog modem, partly on a V.90 client modem, partly on a V.90 client modem and partly on a V.90 server/digital modem, entirely on a V.90 server/digital modem, or partly on a V.90 server modem, partly on a V.90 client modem, and partly in the PSTN.

For purposes of illustration and in no way limited thereto, exemplary systems, methods, and computer program products for generating a DIL signal are discussed herein in the context of a modem application. It should be understood, however, that the systems, methods, and computer program products for generating a DIL signal may be used in other communication devices that may have a need for a signal with improved performance characteristics in the presence of analog impairments.

Figure 3:
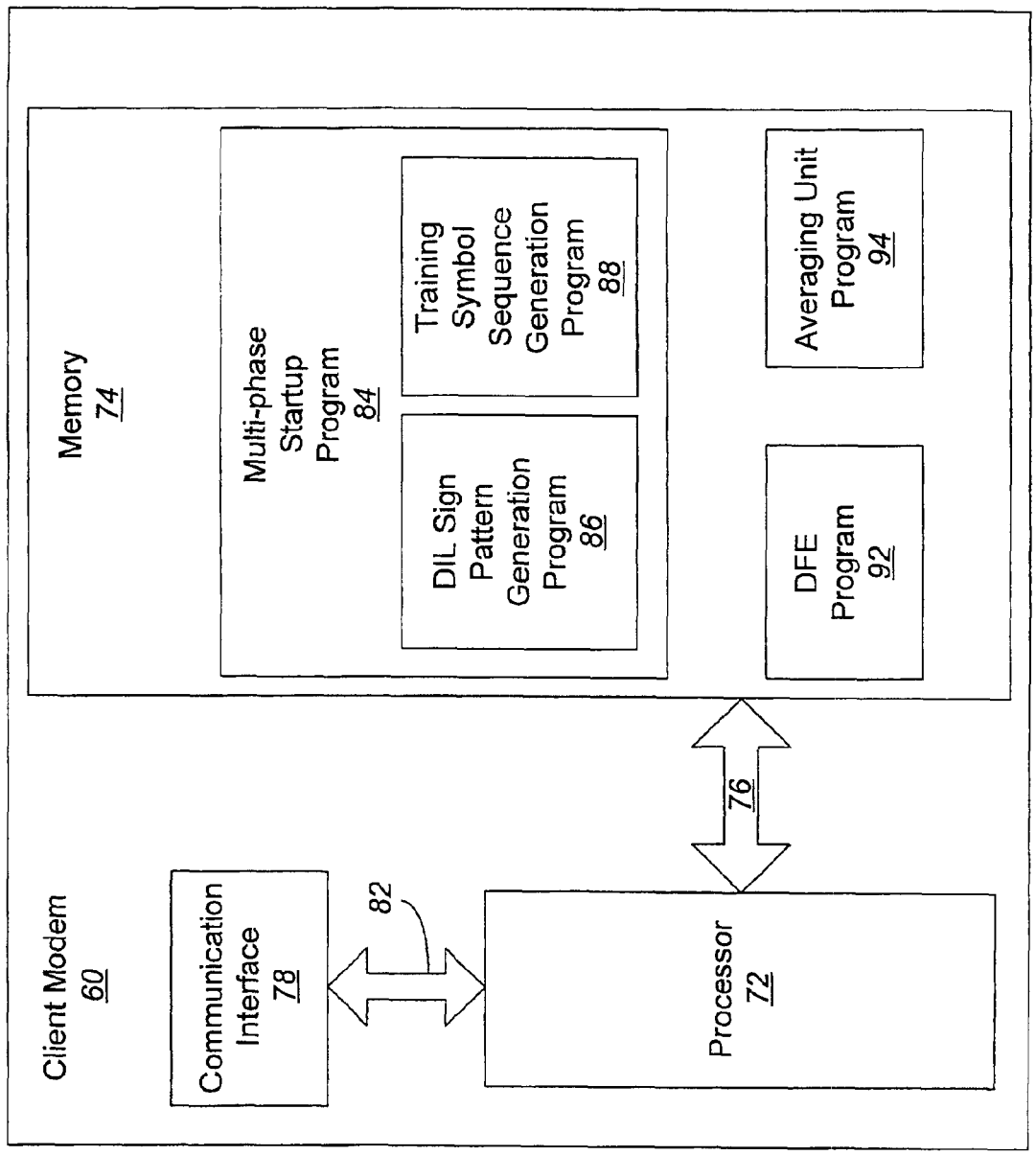
FIG. 3 is a block diagram that illustrates an exemplary V.90 client modem that may incorporate systems, methods, and computer program products for generating a digital impairment learning (DIL) signal in accordance with the present invention.

A block diagram of a V.90 client/analog modem 60 that may incorporate systems, methods, and computer program products for determining a maximum data rate and/or adjusting data transmission power in accordance with the present invention is shown in FIG. 3. The client modem 60 includes a processor 72, preferably a digital signal processor, which communicates with a memory 74 via an address/data bus 76. In addition, the processor 72 may receive and transmit information to external devices via a communication interface 78, which is accessed through an input/output (I/O) bus 82. The processor 72 may be any commercially available or custom processor suitable for a real-time intensive embedded application. The memory 74 is representative of the overall hierarchy of memory devices containing the software and data used to implement the functionality of the V.90 client/analog modem 60. The memory 74 may include, but is not limited to, the following types of devices: cache, ROM, PROM, EPROM, EEPROM, flash, SRAM, and DRAM.

As shown in FIG. 3, the memory 74 includes a multi-phase startup program module 84, which comprises a DIL sign pattern generation program module 86 and a training symbol sequence generation program module 88 The multi-phase startup program module 84 may be used to implement the multi-phase startup procedure/protocol defined in the V.90 Recommendation. As discussed hereinbefore, the V.90 Recommendation provides for the use of a programmable DIL signal, which is transmitted from a server/digital modem to the client/analog modem 60 during phase three of the multi-phase startup procedure. Recall that the content of the DIL signal is specified by the client/analog modem 60 through use of a DIL descriptor.

Thus, the DIL sign pattern generation program 86 and the training symbol sequence generation program 88 may be used to construct or fill in the DIL descriptor, which serves as a template for generating the DIL signal. The memory 74 further includes a decision feedback equalizer (DFE) program module 92 and an averaging unit program module 94. A decision feedback equalizer (DFE) may be used in conjunction with an averaging unit to estimate signal levels for transmitted PCM codes as described, for example, in U.S. application Ser. No. 09/264,085, entitled RECEIVERS, METHODS, AND COMPUTER PROGRAM PRODUCTS FOR AN ANALOG MODEM THAT RECEIVES DATA SIGNALS FROM A DIGITAL MODEM, filed Mar. 8, 1999, the disclosure of which is hereby incorporated herein by reference. A preferred method for estimating or learning the signal levels for the transmitted PCM codes is described in U.S. application Ser. No. 09/264,272 entitled MODEMS, METHODS, AND COMPUTER PROGRAM PRODUCTS FOR IDENTIFYING A SIGNALING ALPHABET IN VARIANCE WITH AN IDEAL ALPHABET DUE TO DIGITAL IMPAIRMMENTS, filed Mar. 8, 1999, the disclosure of which is hereby incorporated herein by reference.

It should be understood that the memory 74 may include further program modules for implementing additional functionality of the V.90 client modem 60, which are not shown in FIG. 3.

The present invention is described herein with reference to flowchart and/or block diagram illustrations of methods, apparatus (systems), and computer program products according to an embodiment of the invention. It will be understood that each block of the flowchart and/or block diagram illustrations, and combinations of blocks in the flowchart and/or block diagram illustrations, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction means that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

In the following discussion, frequent reference is made to the terms "ucode" and "uchord." Through use of the term "ucode" the V.90 Recommendation allows PCM codes to be identified in a manner that is independent of the coding law used (i.e., $\mu$-law or A-law). There are 128 ucodes ranging from 0 to 127, where ucode 0 corresponds to the smallest possible signal amplitude and ucode 127 corresponds to the largest possible signal amplitude. For a particular coding law, a ucode together with a sign bit fully specifies the transmitted PCM code.

A uchord is a group of ucodes. In V.90, eight uchords are defined in which ucodes 0 through 15 comprise a first uchord, ucodes 16 through 31 comprise a second uchord, ucodes 32–47 comprise a third uchord, ucodes 48–63 comprise a fourth uchord, ucodes 64–79 comprise a fifth uchord, ucodes 80–95 comprise a sixth uchord, ucodes 96–111 comprise a seventh uchord, and ucodes 112–127 comprise an eighth uchord. Thus, in summary, ucodes may be considered as corresponding to the symbols transmitted from a server/digital modem to the client/analog modem 60 while the uchords comprise mutually exclusive, contiguous groups of the ucodes or symbols.

It may be helpful to briefly review the content of a DIL signal before discussing operations of the present invention in detail. A DIL signal as used in the V.90 startup procedure comprises one or more repetitions of a DIL sequence. Note that the V.90 recommendation also allows transmission of a partial DIL sequence. The DIL sequence comprises up to N DIL segments, where N is specified in the DIL descriptor. In each DIL segment, two ucodes may be sent: one ucode called the reference symbol and another ucode called the training symbol. A training pattern is specified in the DIL descriptor that describes the order/interleaving pattern between the reference symbol and the training symbol. A sign pattern is specified in the DIL descriptor that describes the sign of each symbol in a DIL segment. The V.90 Recommendation allows eight possible reference symbols, one per uchord, and N training symbols, one per DIL segment, to be specified in the DIL descriptor. Any ucode may be used as a training symbol. Finally, in each DIL segment, the reference symbol corresponding to the uchord in which the training symbol belongs is paired with that training symbol.

Operations of an exemplary V.90 client/analog modem 60 incorporating systems, methods, and computer program products for generating a DIL signal will be described hereafter with reference to the flow charts of FIGS. 4–5 and the architectural diagram of FIG. 3.

As discussed hereinabove, the DIL signal may be distorted by analog impairments, such as transformers, that may introduce nulls at direct current (DC) and severe non-linear distortion below 100 Hz. Moreover, low-pass filters in the PSTN typically have a sharp roll-off at the Nyquist frequency of 4 kHz. Accordingly, to minimize distortion due to analog impairments, it is desirable to generate a DIL signal with low energy around DC and at 4 kHz. It is further desirable that the spectral characteristics of the DIL signal be preserved in the presence of a priori unknown digital impairments.

Unfortunately, use of different ucodes for the training and reference symbols in a DIL segment generally complicates the task of achieving the desired spectral characteristics. Therefore, in a preferred embodiment of the present invention, only the training symbol is sent in each DIL segment; the reference symbol is not used. Each DIL segment may then be viewed as a two-level signal (corresponding to the positive and negative levels associated with the training symbol ucode). Advantageously, the spectral characteristics of a DIL segment may be controlled through the sign pattern, which is specified as part of the DIL descriptor. Any number of such DIL segments may be concatenated, providing essentially the same spectral characteristics as those of an individual segment. Consequently, an entire DIL signal may be generated that, likewise, possesses the spectral characteristics of the individual DIL segments.

The digital PSTN transports information using a six symbol framing structure. That is, a frame comprises six data frame intervals with each data frame interval holding a single symbol. It, therefore, may be desirable to use a DIL segment length, which may be specified in the DIL descriptor, that is wholly divisible by six as specified in the V.90 Recommendation so that the same number of samples per ucode may be obtained in each of the data frame intervals. It may further be desirable that the number of training symbols transmitted in each data frame interval (i.e., the DIL segment length divided by six) is a power of two to simplify the implementation of the averaging unit program 94 on a fixed point processor 72. Each data frame interval may be subject to a different digital impairment, such as PAD(s) and/or RBS, or even no digital impairment, which may cause the amplitudes of the received training symbols to differ slightly between data frame intervals. The received DIL segment is nevertheless a good approximation of a two-level signal and, for sign patterns according to the present invention, has the desired spectral characteristics.

Figure 4:
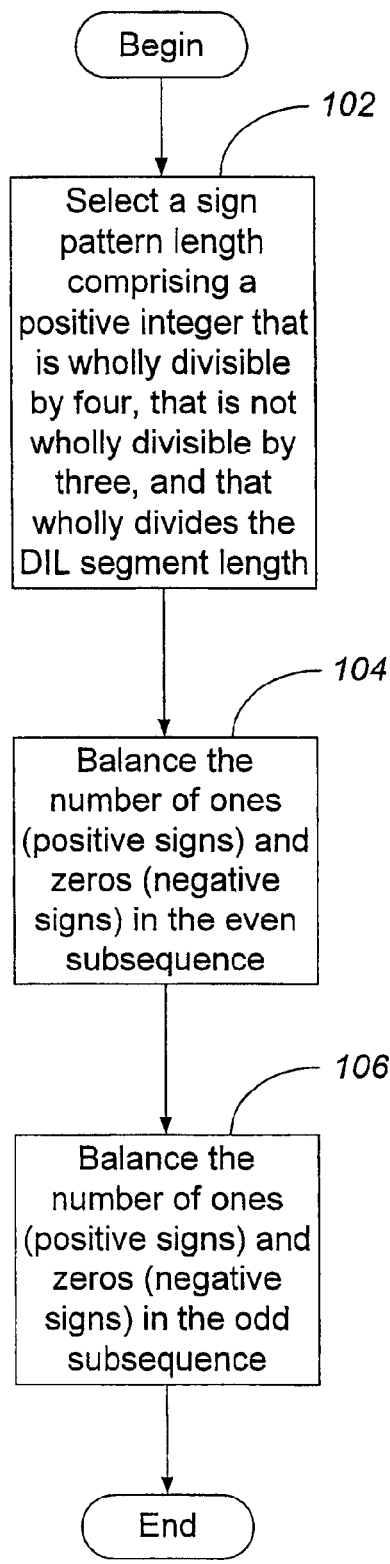
FIG. 4 is a flow chart that illustrates operations of a communication device, such as a V.90 client modem of FIG. 3, for generating a sign pattern for a DIL signal in accordance with aspects of the present invention.

Referring now to FIGS. 3 and 4, operations for generating a sign pattern for a DIL signal, in accordance with an embodiment of the present invention, begin at block 102 where the DIL sign pattern generation program 86 selects a positive integer for the sign pattern length that is wholly divisible by four, not wholly divisible by three, and that, preferably, wholly divides the DIL segment length. Recall that, according to the V.90 Recommendation, the DIL segment length is wholly divisible by six. The sign pattern may be viewed as the result of interleaving two subsequences, namely, an even-index (or simply even) subsequence and an odd-index (or simply odd) subsequence. At block 104, the sign, pattern generation program 86 balances the number of zeros and ones in the even subsequence. That is, the number of zeros and ones are made equal in the even subsequence. Likewise, the sign pattern generation program 86 balances the number of zeros and ones in the odd subsequence at block 106. The zeros in the two subsequences correspond to negative signs while the ones in the two subsequences correspond to positive signs. For a sign pattern generated in accordance with FIG. 4, i.e., with the sign pattern length not wholly divisible by three and both the even and odd subsequences of the sign pattern having a balanced number of zeros and ones, the K-fold repetition of that sign pattern, where K is an integer multiple of three advantageously has a balanced sign distribution in every data frame interval. These advantages are explained by way of an example.

The following sign pattern has a length of 32 and has an equal number of ones and zeros in both the even and odd subsequences:

00111001001011011001001110000111

The ones in the sequence may represent positive signs and the zeros negative signs. For a DIL segment of length 192 (6 * 32), the foregoing sequence may be repeated and organized into a table containing six rows that correspond to the six data frame intervals as follows:

TABLE 1

00101111110100000010111111010000
01110100011101000111010001110100
10000001011111101000000101111110
10100011101000111010001110100011
11110100000010111111010000000101
00011101000111010001110100011101

Table 1 is populated by filling in the sign pattern sequence column by column. Each row in Table 1 has a balanced sign distribution (i.e., sixteen zeros and ones). Such a balanced sign distribution may allow a DIL signal, which comprises one or more such DIL segments, to achieve spectral nulls at DC and at the Nyquist frequency (4 kHz), regardless of the digital impairments present in different data frame intervals.

A row in Table 1 corresponds to the training symbols transmitted in the same data frame interval. Thus, each row may be associated with a signal magnitude A[i], where i ranges from 0 to 5. In other words, a "I" in row i corresponds to +A [i] and a "0" in row i corresponds to −A [i]. In the absence of digital and analog impairments, all A[i] are equal. In the presence of digital impairments, however, the signal amplitudes in different data frame intervals need not be the same. For example, RBS may be present in only one of the six data frame intervals, which may cause the signal amplitude of the training symbol received in that data frame interval to deviate from the amplitude received in other data frame intervals.

Nevertheless, the sum of the samples in each row (i.e., data frame interval) of Table 1 is zero because the sum of the samples in each data frame interval is zero. This is shown as follows:

$$\sum_{j=0}^{191} x[j] = \sum_{i=0}^{5} A[i] \sum_{n=0}^{31} (2 \times p[i][n] - 1) = \sum_{i=0}^{5} A[i] \times 0 = 0$$

where x[j] denotes the sample received at time j in a particular DIL segment and p[i][n] is the sign bit in row i and column n of Table 1. This implies that the DIL signal contains no DC spectral content as described, for example, by Gianfranco L. Pierobon in "Codes for Zero Spectral Density at Zero Frequency," IEEE Transactions on Information Theory, Vol. IT-30, No. 2, March 1984, the disclosure of which is hereby incorporated herein by reference.

In general, a signal has no energy content at the Nyquist frequency only if the alternating running digital sum (ARDS) is bounded or finite at all times. See, e.g., B. H. Marcus, P. H. Siegel, "On codes with Spectral Nulls at Rational Submultiples of the Symbol Frequency,"=0 IEEE Transactions on Information Theory, Vol. IT-33, July 1987, the disclosure of which is hereby incorporated herein by reference. In the context of the present example, the ARDS is determined by adding all of the even training symbol samples and subtracting all of the odd training symbol samples. Counting the rows in Table 1 from zero to five, rows one, three, and five correspond to symbol magnitudes A[1], A[3], and A[5]. Moreover, these rows represent the odd-indexed training symbol samples. Thus, the ARDS may be computed by reversing the bits in rows one, three, and five of Table 1, computing the sum of received symbols across each of the six rows, and then adding the six resulting summations. Recall, however, that the sum of the samples in each row of Table 1 is zero because of the balanced sign distribution in each row. Therefore, the ARDS is also zero, which results in no energy content at the Nyquist frequency of 4 kHz.

Higher power training symbol samples may cause distortion in adjacent segments in the DIL signal sequence due to residual inter-symbol interference and non-linearities in the communication medium. The DIL signal may be designed with a limited difference in training symbol magnitudes between adjacent segments to reduce the distortion in small-magnitude segments due to large-magnitude segments. The sequence of small-magnitude DIL segments is preferably not so long that it could be interpreted by the client/analog modem 60 as silence, which is the mechanism used for initiating retrains in modems, including V.90 modems.

Figure 5:
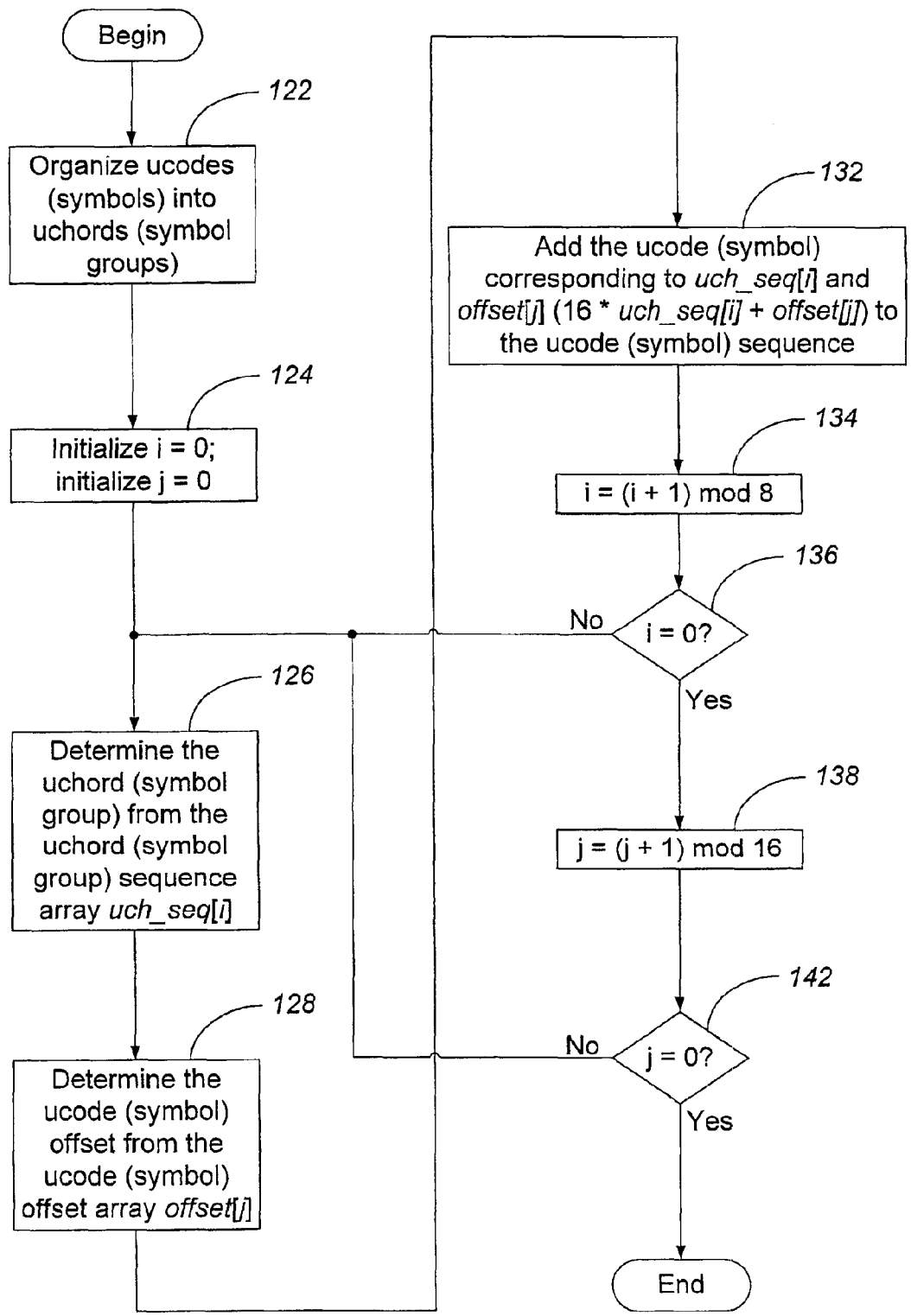
FIG. 5 is a flow chart that illustrates operations of a communication device, such as a V.90 client modem of FIG. 3, for generating a DIL signal in accordance with aspects of the present invention.

Referring now to FIGS. 3 and 5, operations for generating a DIL signal in which distortion in lower power (i.e., smaller amplitude) training symbols due to adjacent, higher power (i.e., larger amplitude) training symbols may be reduced will be discussed hereafter.

At block 122, the training symbols are organized into symbol groups. This corresponds to the grouping of ucodes into uchords as discussed hereinabove. In a preferred embodiment, the training symbol sequence generation program 88 uses two arrays for determining a sequence of training symbols that will comprise the DIL signal. The first array is the uchord sequencing array (uch_seq[ ]), which defines an order or a sequence for the uchords. The second array is the ucode offset array (offset[ ]), which defines an order or a sequence for the ucodes within each uchord.

Preferably, the offset array (offset[ ]) is a pseudo-random sequence to facilitate a more even power distribution in the DIL signal. In a preferred embodiment, the uchord sequencing array and the ucode offset array are populated as set forth below:

uch_seq[8 ]={0, 2, 4, 6, 7, 5, 3, 1 } offset[16 ]={1, 4, 7, 10, 13, 0, 3, 6, 9, 12, 15, 2, 5, 8, 11, 14}

The arrays are depicted as static data structure for purposes of illustration. It is understood that the arrays may be dynamic data structures to facilitate changes to the uchord and/or the ucode offset sequences.

The training symbol sequence generation program 88 initializes two index variables i and j at block 124, which are used to index the uchord sequence array (uch_seq[ ]) and the ucode offset array (offset[ ]), respectively. A uchord is determined at block 126 by using the index variable i to read the contents of the uchord sequence array (uch_seq[i]). Similarly, at block 128, a ucode offset is determined by using the index variable j to read the contents of the ucode offset array (offset[j]). At block 132, a ucode may be selected as the next symbol for inclusion into the sequence of training symbols comprising the DIL signal by multiplying the uchord sequence number, which was determined at block 126, by 16 and adding the ucode offset, which was determined at block 128. The k-th training symbol in the DIL signal may be expressed as follows:

training symbol(k)=16*uch_seq[i]+offset[j], where k =(8* j)+i.

Note that k may range from zero up to N, which is the number of DIL segments in the DIL signal.

The index variable i is incremented using a modulus of eight at block 134. If the index variable i is not equal to zero as determined at block 136, then operations continue at block 126 where the ucode having the same ucode offset is selected from the next uchord in the uchord sequence array (uch_seq[ ]). On the other hand, if the index variable i is equal to zero, as determined at block 136, then the index variable j is incremented using a modulus of 16 at block 138. If the index variable j is equal to zero, as determined at block 142, then the ucode from the last uchord in the uchord sequence array (uch_seq[ ]) and corresponding to the last offset in the ucode offset array (offset[ ]) has been added to the training symbol sequence for the DIL signal allowing operations to terminate. Otherwise, if the index variable j is not equal to zero as determined at block 142, then operations continue at block 126 where the next group of eight symbols to be added to the training symbol sequence will be selected from the eight uchords based on the order specified in the uchord sequence array (uch_seq[ ]) and using the ucode offset obtained from the ucode offset array (offset[ ]) as discussed in the foregoing.

Using the preferred values set forth hereinabove for the uchord sequence array (uch_seq[ ]) and the ucode offset array (offset[ ]), the sequence of training symbol ucodes becomes:

1, 33, 65, 97, 113, 81, 49, 17

4, 36, 68, 100, 116, 84, 52, 20

●

●

14, 46, 78, 110, 126, 94, 62, 30

Thus the training symbol sequence generation program 88 uses the uchord sequence array (uch_seq[ ]) to space lower magnitude ucodes away from higher power ucodes in the training symbol sequence. A maximum symbol group or uchord spacing difference may be defined, which can be used in constructing the uchord sequence array (uch_seq[ ]). For example, in the exemplary uchord sequence array (uch_seq[ ]), adjacent uchords do not exceed a uchord spacing difference of two. In fact, the spacing between all uchords in the sequence is equal to two, except for the spacing between uchords six and seven and the spacing between uchords one and zero (i.e., when the uchord sequence repeats), which is one.

Noise spikes in a communication medium may distort some DIL segments. Such impairments may lead to estimated DIL signal levels that deviate considerably from the expected level. In the absence of noise, the signal levels associated with the ucodes monotonically increase in concert with the ucodes. It may be possible to detect outlying signal levels that have been corrupted by noise spikes provided that the next lower and next higher ucode signal levels are not corrupted as described, for example, in in U.S. application Ser. No. 09/432,023, entitled SYSTEMS, METHODS AND COMPUTER PROGRAM PRODUCTS FOR FILTERING GLITCHES FROM MEASURED VALUES IN A SEQUENCE OF CODE POINTS, filed Oct. 29, 1999, the disclosure of which is hereby incorporated herein by reference. Therefore, in accordance with the present invention, adjacent training symbols do not belong to the same uchord and, preferably, the ucode offset array (offset[ ]) is populated such that highest and lowest offsets do not comprise the last and first elements of the array, respectively. For example, uchords six and seven are adjacent to one another in the exemplary uchord sequence array (uch_seq[ ]). Thus, if the ucode offset array (offset[]) contained zero and fifteen as its first and last elements, respectively, then ucodes 111 and 112 would be adjacent in the DIL signal sequence, which is undesirable as discussed in the foregoing.

DIL signal levels typically form the basis for constellation generation. Because the desired separation between signal levels may be chosen dynamically, the selected ucodes may not be known in advance. In addition, many of the lowest ucodes may be excluded from the DIL signal because their differential spacing may be too small for even low-noise modem connections. The largest ucodes may also be discarded because of possible non-linearities and/or power limit constraints imposed by the server/digital modem. Therefore it may be desirable to use a contiguous range of training symbols or ucodes in the DIL signal with the range being defined by a minimum ucode (umin) and a maximum ucode (umax).

The present invention allows groups of symbols to be excluded by eliminating uchord entries from the uchord sequence array (uch_seq[ ]). For example, to eliminate the sixteen highest ucodes (uchord seven) and sixteen lowest ucodes (uchord zero) from the DIL signal, the uchord sequence array (uch_seq[ ]) may be populated as follows:

uch_seq[6 ]={2, 4, 6, 5, 3, 1 }

Alternatively, entries may also be deleted from the ucode offset array (offset[ ]), which will uniformly eliminate selected ucodes from each of the uchords defined in the uchord sequence array (uch_seq[ ]). A combination of eliminating uchords and eliminating ucode offsets may also be used. If entries are eliminated from one or both of the arrays, then the modulus used in the arithmetic operations of blocks 134 and 138 of FIG. 5 should be updated accordingly.

Finally, the DIL signal levels may be estimated by averaging the magnitudes of equalizer outputs corresponding to the same transmitted ucode. This averaging is performed separately for each data frame interval. Hence, it may be desirable to have a DIL sequence that approaches the maximum allowable duration permitted by the V.90 recommendation, which is five seconds. In a preferred embodiment, umin is set to 10 and umax is set to 109 so that the DIL signal comprises 100 training symbols. The DIL segment length is set to 384 (each ucode is repeated 64 times in each data frame interval), which results in a DIL signal length of 38400 training symbols. At 8000 symbols per second, the DIL signal duration is 4.8 seconds. In another preferred embodiment, the DIL segment length is set to 192 (each ucode is repeated 32 times in each data frame interval), which results in a DIL signal duration of 2.4 seconds. Thus, the present invention may provide flexibility in allowing a trade-off between the quality of the DIL signal level averages and time spent in the start-up phase.

The flow charts of FIGS. 4 and 5 illustrate the architecture, functionality, and operations of a possible implementation of the V.90 client/analog modem 60 software. In this regard, each block represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

While the present invention has been illustrated and described in detail in the drawings and foregoing description, it is understood that the embodiments shown are merely exemplary. Moreover, it is understood that many variations and modifications can be made to the embodiments described hereinabove without substantially departing from the principles of the present invention. All such variations and modifications are intended to be included herein within the scope of the present invention, as set forth in the following claims.

We claim:

1. A system for generating a digital impairment learning (DIL) signal, comprising:

means for organizing a plurality of symbols into a plurality of mutually exclusive symbol groups, each of the plurality of symbol groups being associated with a contiguous subset of the plurality of symbols; and means for generating a sequence of symbols selected from the plurality of symbols such that adjacent symbols in the sequence are associated with different symbol groups of the plurality of symbol groups and the different symbol groups are separated by at most a maximum group spacing difference.

2. A system as recited in claim 1, wherein the maximum group spacing difference is two.

3. A system as recited in claim 1, wherein the means for generating the sequence comprises:

means for defining a symbol group sequence;

means for defining a symbol offset sequence that specifies sub-sequences within the sequence of symbols, each sub-sequence corresponding to symbols comprising one of the plurality of symbol groups; and means for selecting each symbol in the sequence from the plurality of symbols in accordance with the symbol group sequence and from within each of the plurality of symbol groups in accordance with the symbol offset sequence.

4. A system as recited in claim 3, wherein the symbol offset sequence is a pseudo-random sequence.

5. A system as recited in claim 1, wherein the means for generating the sequence of symbols selected from the plurality of symbols comprises:

means for generating a sequence of symbols selected from a contiguous portion of the plurality of symbols such that adjacent symbols are associated with different symbol groups of the plurality of symbol groups and the different symbol groups are separated by at most two of the plurality of symbol groups.

6. A system for generating a digital impairment learning (DIL) signal, comprising:

means for organizing a plurality of ucodes into a plurality of uchords;

means for defining a uchord sequence;

means for defining a ucode offset sequence; and means for generating a sequence of ucodes, each ucode in the sequence being selected from the plurality of ucodes in accordance with the uchord sequence and from within each of the plurality of uchords in accordance with the ucode offset sequence.

7. A system as recited in claim 6, wherein the plurality of ucodes comprises 128 ucodes, the plurality of uchords comprises 8 uchords, each of the uchords being associated with 16 contiguous ucodes, and the uchord sequence is defined as 0, 2, 4, 6, 7, 5, 3, 1.

8. A system as recited in claim 6, wherein the plurality of ucodes comprises 128 ucodes, the plurality of uchords comprises 8 uchords, each of the uchords being associated with 16 contiguous ucodes, and the ucode offset sequence is defined as 1, 4, 7, 10, 13, 0, 3, 6, 9, 12, 15, 2, 5, 8, 11, 14.

9. A method of generating a digital impairment learning (DIL) signal, comprising the steps of:

organizing a plurality of symbols into a plurality of mutually exclusive symbol groups, each of the plurality of symbol groups being associated with a contiguous subset of the plurality of symbols; and generating a sequence of symbols selected from the plurality of symbols such that adjacent symbols in the sequence are associated with different symbol groups of the plurality of symbol groups and the different symbol groups are separated by at most a maximum group spacing difference.

10. A method as recited in claim 9, wherein the maximum group spacing difference is two.

11. A method as recited in claim 9, wherein the step of generating the sequence comprises the steps of:

defining a symbol group sequence;

defining a symbol offset sequence that specifies subsequences within the sequence of symbols, each subsequence corresponding to symbols comprising one of the plurality of symbol groups; and selecting each symbol in the sequence from the plurality of symbols in accordance with the symbol group sequence and from within each of the plurality of symbol groups in accordance with the symbol offset sequence.

12. A method as recited in claim 11, wherein the symbol offset sequence is a pseudo-random sequence.

13. A method as recited in claim 9, wherein the step of generating the sequence of symbols selected from the plurality of symbols comprises the step of:

generating a sequence of symbols selected from a contiguous portion of the plurality of symbols such that adjacent symbols are associated with different symbol groups of the plurality of symbol groups and the different symbol groups are separated by at most two of the plurality of symbol groups.

14. A method of generating a digital impairment learning (DIL) signal, comprising the steps of:

organizing a plurality of ucodes into a plurality of uchords;

defining a uchord sequence;

defining a ucode offset sequence; and generating a sequence of ucodes, each ucode in the sequence being selected from the plurality of ucodes in accordance with the uchord sequence and from within each of the plurality of uchords in accordance with the ucode offset sequence.

15. A method as recited in claim 14, wherein the plurality of ucodes comprises 128 ucodes, the plurality of uchords comprises 8 uchords, each of the uchords being associated with 16 contiguous ucodes, and the uchord sequence is defined as 0, 2, 4, 6, 7, 5, 3, 1.

16. A method as recited in claim 14, wherein the plurality of ucodes comprises 128 ucodes, the plurality of uchords comprises 8 uchords, each of the uchords being associated with 16 contiguous ucodes, and the ucode offset sequence is defined as 1, 4, 7, 10, 13, 0, 3, 6, 9, 12, 15, 2, 5, 8, 11, 14.

17. A computer program product for generating a digital impairment learning (DIL) signal, comprising:

a computer readable storage medium having computer readable program code embodied therein, the computer readable program code comprising:

computer readable program code for organizing a plurality of symbols into a plurality of mutually exclusive symbol groups, each of the plurality of symbol groups being associated with a contiguous subset of the plurality of symbols; and computer readable program code for generating a sequence of symbols selected from the plurality of symbols such that adjacent symbols in the sequence are associated with different symbol groups of the plurality of symbol groups and the different symbol groups are separated by at most a maximum group spacing difference.

18. A computer program product as recited in claim 17, wherein the maximum group spacing difference is two.

19. A computer program product as recited in claim 17, wherein the computer readable program code for generating the sequence comprises:

computer readable program code for defining a symbol group sequence;

computer readable program code for defining a symbol offset sequence that specifies sub-sequences within the sequence of symbols, each sub-sequence corresponding to symbols comprising one of the plurality of symbol groups; and computer readable program code for selecting each symbol in the sequence from the plurality of symbols in accordance with the symbol group sequence and from within each of the plurality of symbol groups in accordance with the symbol offset sequence.

20. A computer program product as recited in claim 19, wherein the symbol offset sequence is a pseudo-random sequence.

21. A computer program product as recited in claim 17, wherein the computer readable program code for generating the sequence of symbols selected from the plurality of symbols comprises:

computer readable program code for generating a sequence of symbols selected from a contiguous portion of the plurality of symbols such that adjacent symbols are associated with different symbol groups of the plurality of symbol groups and the different symbol groups are separated by at most two of the plurality of symbol groups.

22. A computer program product for generating a digital impairment learning (DIL) signal, comprising:
a computer readable storage medium having computer readable program code embodied therein, the computer readable program code comprising:
computer readable program code for organizing a plurality of ucodes into a plurality of uchords;
computer readable program code for defining a uchord sequence;
computer readable program code for defining a ucode offset sequence; and
computer readable program code for generating a sequence of ucodes, each ucode in the sequence being selected from the plurality of ucodes in accordance with the uchord sequence and from within each of the plurality of uchords in accordance with the ucode offset sequence.

23. A computer program product as recited in claim 22, wherein the plurality of ucodes comprises 128 ucodes, the plurality of uchords comprises 8 uchords, each of the uchords being associated with 16 contiguous ucodes, and the uchord sequence is defined as 0, 2, 4, 6, 7, 5, 3, 1.

24. A computer program product as recited in claim 22, wherein the plurality of ucodes comprises 128 ucodes, the plurality of uchords comprises 8 uchords, each of the uchords being associated with 16 contiguous ucodes, and the ucode offset sequence is defined as 1, 4, 7, 10, 13, 0, 3, 6, 9, 12, 15, 2, 5, 8, 11, 14.

* * * * *